United States Patent Office 3,226,453
Patented Dec. 28, 1965

3,226,453
METHOD OF PREPARING BLENDS OF POLYSTYRENE, BUTADIENE ELASTOMER AND GRAFT COPOLYMER OF STYRENE ON SAID ELASTOMER
Vernon W. Arnold, Hammond, Ind., and Don E. Pickart, Wappingers Falls, N.Y., assignors to Standard Oil Company, Chicago, Ill., a corporation of Indiana
No Drawing. Filed June 7, 1963, Ser. No. 286,158
3 Claims. (Cl. 260—876)

This application is a continuation-in-part of our copending application Serial No. 36,755 of Vernon W. Arnold and Don E. Pickart, filed June 17, 1960, now abandoned.

This invention relates to the preparation of polystyrene molding compositions. More particularly, it concerns a process for preparing such compositions to afford homogeneous blends of polymeric styrene and rubbery polymers having improved impact properties and which are easy to mold and/or extrude to smooth, glossy uniform sheets. The invention is especially concerned with processes for the preparation of useful high impact polystyrene compositions by compounding certain rubbery polymers and graft polymers with hydrocarbon solutions of polystyrene.

Ternary compositions comprising mixtures of (1) styrene-type resins, (2) graft copolymers of styrene on a rubbery butadiene polymer or copolymer backbone and (3) rubbery butadiene polymers or copolymers have recently been disclosed (U.S. Patent No. 2,755,270 of Robert A. Hayes). Such compositions, especially those containing from 80–95% of polystyrene based on the weight of polymeric ingredients in the resinous composition are particularly useful for injection molding applications in that they combine the excellent strength and hardness of polystyrene with a high degree of resistance to impact loads.

As a result of a comprehensive research program directed to the development of a process for the production of high impact polystyrene, we have found that the manner in which graft copolymer and elastomer are admixed or blended with the polystyrene resin is of utmost importance in obtaining polystyrene compositions having commercially desirable physical properties. Such properties include, for example, an impact resistance of from about 1.0 to about 2.0 pounds per inch notch (ASTM Test—D256–56), percent elongation of from about 10 to about 40 (ASTM Test—D638–56T), hardness between about Rockwell-M 30 and 60 (ASTM Test—D785–51), and softening point above about 65° C. (Test—D648–56). Such a combination of properties provides a resinous composition which is tough and resistant to cracking, yet readily molded or extruded on high speed injection molding machines.

Specifically, we have found that ternary compositions of the aforementioned type containing more than about 80% polystyreine are advantageously prepared by employing as a source of polystyrene, a solution of polystyrene in an aromatic hydrocarbon solvent. In accordance with the process of our invention, an aqueous latex of a graft copolymer and an aqueous latex of an elastomeric polymer, further described hereinafter, are added to a hydrocarbon solution of polystyrene and the water accompanying the latices removed by azeotropic distillation. The resultant dispersion of added polymers in polystyrene solution is then homogenized and the residual solvent removed by volatilization. Finally, the homogeneous blend of polymeric materials is extruded to form desirable polystyrene compositions.

We have further found that desirable high impact compositions can be obtained by first coagulating either or both the graft copolymer and elastomer latices, adding the filtered coagulum to the polystyrene solution, subsequently removing any water accompanying the coagulated latices by azeotropic distillation, and recovering the desired high impact polystyrene blend from the excess solvent as described above. In so operating, we have found it essential to avoid drying of the latices prior to blending with the hydrocarbon solution of polystyrene in order to obtain polystyrene compositions having the desired high impact and other requisite physical properties.

By operating in accordance with the processes described herein, significantly superior compositions are obtained compared to those obtained by conventional processes such as by mill blending of the component resinous materials to form polystyrene compositions.

Polystyrene ordinarily useful for molding or for incorporation into molding compositions can be used as one component of the compositions produced by our process. Such polystyrene resins may be obtained by bulk or emulsion polymerization of styrene using peroxidic or other known catalysts. Since our process requires the use of a hydrocarbon solution of polystyrene, we prefer to employ a resin solution prepared by polymerization of styrene in an aromatic solvent, for example, hydrocarbon solutions of polystyrene which are obtained in accordance with the processes described in U.S. Patents 2,813,089 and 2,920,065. It is to be understood, however, that solutions of polystyrene obtained by dissolving polystyrene, prepared in accordance with methods well known to the art in an aromatic hydrocarbon solvent are equally applicable to our improved process.

Preferred polystyrene resins for our purpose have an intrinsic viscosity (measured in benzene at 30° C.) of from about 0.8 to about 1.5 dl./g. and are characterized by impact strength in the range of from about 0.25 to 0.40 ft. lb./in. notch (ASTM—D256–56).

The rubbery polymer employed in the compositions produced herein comprises a conventional "hot" or "cold" rubbery homopolymer of butadiene or a copolymer of butadiene and styrene containing at least 50% butadiene together with up to 50% styrene. Such homopolymers or copolymers may be the same or different within the indicated composition range, as the polymer or copolymer employed as the backbone of the graft copolymer component of the final ternary compositions. We have found that the proportion of styrene in the copolymer is critically maintained below 50 weight percent, higher styrene contents leading to greatly reduced impact strength of the final composition. Such homopolymers or copolymers of butadiene and styrene are commercially available, or may be prepared by polymerization in emulsion in a manner well known to the art. In accordance with the process of our invention, the latex produced in the polymerization reaction is added to the polystyrene solution for compounding, or alternatively, is first coagulated alone or in admixture with the graft copolymer latex, and the coagulate blended with the polystyrene solution. Where a coagulated copolymer is employed, it is essential that the wet coagulum be employed, in order to preserve the high impact properties of the resultant ternary composition.

The graft copolymer component of the compositions produced by the process of the present invention is prepared by effecting free radical polymerization of styrene in the presence of a previously prepared latex of butadiene homopolymer or copolymer with styrene. The amount of styrene which is grafted upon the butadiene-containing backbone can be varied from about 10 to about 80% by weight, based upon the weight of backbone, desirably 10–50%, and preferably 15–30%. In general, polymerization techniques known in the art, employing free radical generating catalysts can be employed, together with such known polymerization ingredients as emulsifying agents, chain transfer agents and the like for effecting complete and rapid polymerization of the monomeric styrene. In the graft polymerization reaction, it appears that a substantial portion of the polystyrene becomes attached to the backbone chain, and that a relatively minor amount of free polystyrene is formed. As previously discussed for the elastomer latex, it is essential that the graft polymer be added to the polystyrene solution as a latex, or as a wet coagulate. We have found that drying the graft latex, either for the purpose of adding to polystyrene solution, or for the purpose of dry blending and milling with polystyrene, results in ternary polymeric compositions of inferior impact strength.

In our process for the preparation of high impact polystyrene compositions, aqueous latices of elastomeric polymer and of graft copolymer containing from about 20–80%, preferably 40–60%, by weight solids are admixed with a polystyrene solution in aromatic hydrocarbon solvent. Compositions prepared by the process of our invention preferably comprise about 80–90% by weight polystyrene, from 5–10% by weight elastomeric polymer and from about 5–10% by weight graft copolymer. The polystyrene solution comprises from about 10 to 50% by weight polystyrene, preferably 15–25% polystyrene dissolved in an aromatic hydrocarbon such as benzene, toluene, ethylbenzene, xylenes, and the like. The particular solvent employed is not critical. The water which accompanies the latices is removed from the polystyrene solution by azeotropic distillation, preferably at atmospheric or subatmospheric pressure to give a suspension of the added resins in polystyrene solution. A portion of the added polymers may be dissolved in the polystyrene solution. This suspension of elastomeric and graft polymer is preferably homogenized to obtain a more uniform distribution of the added resin, and to disperse large particles of gel by passage through a homogenizer at a pressure between about 500 and 5000 p.s.i.g., preferably below 3000 p.s.i. Any type of homogenizing equipment may be employed for this purpose. Prior to, or after homogenization, other materials including internal lubricants such as mineral oil, butylstearate and the like, color stabilizers, antioxidants, etc. in desired amounts may be blended with the polystyrene solution.

The homogenized polystyrene solution is then treated for removal of residual solvent. For this purpose, the solution can be passed through a continuous vacuum extruder at a temperature between about 100° C. and about 250° C. wherein the excess solvent is removed under vacuum and the polystyrene composition recovered as an extrudate of uniform composition essentially free of solvent.

Alternatively, the elastomeric latex and the latex graft polymer can be pretreated, prior to addition to the polystyrene solution, with coagulating agents such as sodium chloride, calcium chloride, etc., and the precipitated polymer separated from the bulk of the water by filtration. The latices may be so treated individually, or first blended in desired proportions. The coagulated latex is then advantageously washed free of emulsifying agents and polymerization catalysts with water, methanol or mixtures thereof, and the coagulum added in the indicated proportions to the polystyrene solution. When coagulated latices are employed, it is essential that they be added to the polystyrene solution without prior drying, and the adherent water, methanol, etc. be removed by azeotropic distillataion as previously described. Dried coagulated polymer cannot be dispersed in the polystyrene solution so as to obtain polystyrene compositions having the desired high impact properties. In employing coagulated polymers, adherent water is removed by azeotropic distillation and the polymer solution then worked up in the same manner described above.

EXAMPLE 1

A graft copolymer of styrene upon a polybutadiene backbone was prepared as follows.

360 g. of a conventional "cold" polybutadiene latex containing 60% solids was placed in a two-liter resin kettle with 439 ml. distilled water. To this was added 144 g. monomeric styrene, and the mixture stirred under nitrogen for one hour. Then 7.2 g. potassium persulfate dissolved in 250 g. distilled water was added, and the temperature raised to 45° C. Polymerization was allowed to proceed for 24 hours.

The resultant latex was then employed for the preparation of polystyrene-rubbery polymer-graft polymer blends by a number of compounding techniques. For this purpose, solid polystyrene or, where indicated, a solution of polystyrene in xylene (20% by weight) was used, the polystyrene having an intrinsic viscosity of 1 dl./g. measured in benzene at 30° C. The elastomeric polymer latex used was the polybutadiene latex employed for the preparation of the graft copolymer. In each case, the resinous compositions consisted of 10% graft copolymer, 8% elastomer and 82% polystyrene.

A. *Mill blending*

The graft copolymer latex and polybutadiene latex were mixed in desired proportions and were treated with a solution of 0.5% calcium chloride to coagulate the polymers. The precipitated polymer was then washed and dried in an inert atmosphere at 50° C. under reduced pressure. A mixture of polystyrene, and dried coagulate so obtained was prepared and blended on a two-roll mill at a temperature of 140° C. for 20 minutes. The milling was continued until the sample became homogeneous. The banded blend was then cooled, ground and injection molded into ¼ x ½ x 6" bars and tested for impact properties (ASTM D256–56). The impact strength was 0.76 ft. lb./in. notch. It was found that in many cases a homogeneous blend could not be prepared, and that the impact strength on duplicate samples varied as much as 0.8 ft. lb./in. notch, indicating that this method of blending was entirely unsatisfactory for the preparation of uniform samples of desirable impact strength.

B. *Aqueous latex blending*

Here the graft copolymer and elastomer latices were added directly to a polystyrene solution in xylene containing 25% by weight polystyrene. The water was removed by azeotropic distillation of the resultant mixture at a temperature of 38–65° C. and pressure of 60 mm. and the dispersion of rubbery polymer in residual xylene passed through a vented vacuum extruder at a temperature of 450° F. to remove residual solvent. The extrudate was molded and tested and found to have an impact strength of 1.28 ft. lbs./in. notch.

C. *Coagulated latex blending*

In this example, the graft copolymer and elastomer latices were mixed and coagulated, as above (A), the coagulum filtered and washed with water. The wet coagulate was then added to the polystyrene solution. Water accompanying the coagulate was removed by azeotropic drying and the dispersion of rubbery polymers of polystyrene solution passed through a vacuum extruder as above. The resultant composition had an impact strength of 1.82 ft. lbs./in. notch.

EXAMPLE 2

A series of experiments were conducted to determine the effect of varying the styrene content of the elastomeric polymer employed in the polystyrene compositions. In each case, the graft copolymer consisting of styrene grafted on a polybutadiene backbone (40% styrene-60% by weight polybutadiene) employed was prepared as a latex as described in Example 1. The graft copolymer latex and the latex of elastomeric polymer were blended with a 20% solution of polystyrene in xylene, and the water accompanying the latices removed by azeotropic distillation at a temperature below 65° C. The latices were employed in an amount calculated to give a final polystyrene composition consisting of 10% graft copolymer, 8% elastomer and 82% polystyrene. The dehydrated solution of polystyrene was then passed through a vented vacuum extruder for recovery of the solvent-free polystyrene composition.

TABLE I.—VARIATION OF STYRENE CONTENT IN ELASTOMER

| Run No. | Percent Styrene in Elastomer [1] | Impact Strength, ft.lbs./in. notch |
|---|---|---|
| 1 | 0 | 2.14 |
| 2 | 30.0 | 1.99 |
| 3 | 46.5 | 2.01 |
| 4 | 60 | 0.54 |
| 5 | 67 | 0.40 |

[1] Elastomer comprised styrene and butadiene.

EXAMPLE 3

A series of experiments was conducted to determine the effect of varying the styrene content of the base chain employed for preparation of the graft copolymer. In each case, a graft copolymer was prepared by grafting styrene in an amount of 40 parts upon 60 parts of a polystyrene-butadiene base chain having the indicated styrene composition. The elastomeric polymer employed in each run was a styrene-butadiene copolymer consisting of 30% styrene-70% butadiene, and the resinous components were compounded by the aqueous latex method in proportions calculated to give a final polystyrene composition consisting of 10% graft copolymer, 8% elastomer and 82% polystyrene. The impact strengths of the final blends are given in Table II.

TABLE II.—VARIATION OF STYRENE CONTENT IN GRAFT COPOLYMER BASE CHAIN

| Run No. | Wt. percent Styrene in Base Chain | Impact Strength, ft.lbs./in. notch |
|---|---|---|
| 6 | 0 | 1.99 |
| 7 | 30.0 | 1.39 |
| 8 | 46.5 | 1.42 |
| 9 | 60.0 | 0.83 |
| 10 | 67 | 0.52 |

EXAMPLE 4

A graft copolymer consisting of 60% by weight polybutadiene backbone, 40% polystyrene side chains (graft) was prepared by stirring 360 g. of an aqueous polybutadiene latex (containing 216 g. polybutadiene), 144 g. monomeric styrene and 7.2 g. potassium persulfate in 689 ml. distilled water for 24 hours at 45° C. An aliquot of the resultant graft copolymer latex containing 6.2 parts graft copolymer (solid basis) was admixed with an aqueous dispersion containing 4.9 parts solids of a styrene-butadiene copolymer consisting of 70% butadiene-30% styrene, and the mixed latices coagulated by addition of 30 parts of 0.5% aqueous calcium chloride solution. The co-coagulum was washed with water and centrifuged to effect partial removal of water. After centrifuging the co-coagulum contained 43% water.

The co-coagulum was then added to 335 parts of a solution of 25% polystyrene dissolved in xylene, the mixture well stirred and then homogenized by passing through a homogenizer at 3000 p.s.i.g. pressure. The homogenized dispersion was filtered, 4.7 parts mineral oil was added as a lubricant together with 0.5 part of an alkaryl phosphite stabilizer. The dispersion was then passed through a devolatilizing vacuum extruder for removal of water and xylene. The resultant resinous polystyrene had a notched Izod impact strength of 1.05 ft. lbs./in. notch and was smooth and glossy when extruded.

In a second experiment, the same graft copolymer, rubbery butadiene-styrene copolymer and polystyrene solution were employed to prepare a lubricated and stabilized polystyrene composition except that the coagulated graft polymer and rubbery polymer were first dried to 0.1% moisture content prior to incorporation in the polystyrene solution. The resultant resin had a notched Izod impact strength of only 0.37 ft. lb./in. notch and was very rough and had a dull surface.

EXAMPLE 5

In order to correlate impact strength with the amount of graft copolymer and elastomeric polymer compounded with polystyrene, a series of runs were made in which the amount of total compounding (graft and elastomer) was varied from 5% to 18% by weight of the total product. In each run, the ratio of graft copolymer to elastomer was maintained constant at 5 parts graft (40% styrene-60% polybutadiene, prepared as in Example 3) to 4 parts elastomer (30% styrene-70% butadiene). The results of physical tests on the products of these runs are given in Table III. It will be noted that as the percent total compounding increased, there was a corresponding increase in impact strength and elongation, coupled with a decrease in tensile strength, flexural modulus and hardness. The heat distortion temperature was relatively unaffected.

TABLE III

| Run No. | Percent Polystyrene | Percent Graft Copolymer | Percent Elastomer | Izod Impact, ft.lbs./in. notch |
|---|---|---|---|---|
| 11 | 82 | 10 | 8 | 2.0 |
| 12 | 86 | 7.9 | 6.1 | 1.8 |
| 13 | 90 | 5.6 | 4.4 | 1.1 |
| 14 | 94 | 3.3 | 2.7 | 0.7 |

| Run No. | Tensile Strength, p.s.i. | Flex. Modulus, p.s.i. | Percent Elongation | Distortion Temperature, ° C. | Hardness Rockwell |
|---|---|---|---|---|---|
| 11 | 4,780 | 315,300 | 30.4 | 80.5 | 35 |
| 12 | 4,990 | 358,800 | 31.3 | 82.0 | 47 |
| 13 | 5,420 | 381,800 | 25.7 | 82.5 | 58 |
| 14 | 5,860 | 415,300 | 20.4 | 82.0 | 65 |

The compositions shown in the examples can be used as molding powders to produce articles having improved toughness properties. If desired, other compositions may be modified through the addition of various conventional additives, such as dyes, pigments, lubricants, fillers, plasticizers, stabilizers, etc. While the invention has been described herein with particular reference to various preferred embodiments thereof and examples have been given of suitable proportions and conditions, it will be appreciated that variations from the details given herein can be effected without departing from the invention in its broadest aspects. It is also apparent from the data presented herein that for the purposes of our invention, the use of a wet coagulum of a latex is equivalent to the use of an aqueous latex in the preparation of the inventive compositions.

We claim:

1. In a process for preparing styrene polymer resins of high impact strength comprising a substantially homogeneous mixture of (a) a polystyrene resin, (b) an elastomeric polymer, of butadiene and styrene containing at least 50% by weight of butadiene and (c) a graft copolymer, of 10 to 80 weight percent styrene upon said elastomeric polymer, the improvement which comprises the steps of admixing an aqueous latex of said elastomeric polymer and an aqueous latex of said graft copolymer with an inert hydrocarbon solution of polystyrene, dehydrating the resulting mixture by azeotropic distillation of the water accompanying the latices together with a portion of the hydrocarbon solvent, removing the remainder of the hydrocarbon solvent by heating the dehydrated mixture at a temperature between about 100° C. and 250° C. at subatmospheric pressure and recovering the styrene polymer resin so prepared.

2. The process of claim 1 wherein the dehydrated mixture is homogenized at a pressure between about 500 and 5000 pounds per square inch gage prior to heating for removal of solvent.

3. A process for the preparation of a polystyrene resin composition containing an intimate ternary blend of (a) 80% by weight of polystyrene having an intrinsic viscosity (measured in benzene at 30° C.) from about 0.8 to about 1.5 (deciliters per gram), (b) 5–15% by weight of an elastomeric polymer of at least 50% by weight butadiene with up to 50% styrene, and (c) 5–15% by weight of a graft copolymer of 10–80% styrene on said elastomeric polymer, said graft polymer having been prepared by an aqueous emulsion copolymerization reaction of styrene in the presence of a latex of said copolymer which process comprises the steps of admixing said elastomeric polymer and said graft copolymer in the form of aqueous latices with an inert hydrocarbon solution of said polystyrene, dehydrating the resultant mixture by distilling therefrom an azeotrope of water and said inert hydrocarbon solvent, homogenizing the resultant water-free admixture at a pressure between about 500 and 5000 p.s.i.g., removing any remaining solvent by heating said homogenized mixture at a temperature below about 250° C. at subatmospheric pressure and recovering the polystyrene resin composition so prepared.

References Cited by the Examiner

UNITED STATES PATENTS

| 2,562,846 | 7/1951 | Reider et al. | 202—42 |
| 2,755,270 | 7/1956 | Hayes | 260—880 |
| 2,813,089 | 11/1957 | Twaddle et al. | 260—4 |

FOREIGN PATENTS

| 486,628 | 9/1952 | Canada. |
| 644,022 | 10/1950 | Great Britain. |

MURRAY TILLMAN, *Primary Examiner.*